Patented Sept. 10, 1940

2,214,034

UNITED STATES PATENT OFFICE 2,214,034

RACEMIZATION OF OPTICALLY ACTIVE COMPOUNDS

Donalee L. Tabern, Lake Bluff, Ill., assignor to Abbott Laboratories, North Chicago, Ill., a corporation of Illinois No Drawing. Application September 5, 1939, Serial No. 293,400

5 Claims. (Cl. 260—572)

The present invention relates to the racemization of optically active compounds such as the aryl-alkyl-amines. More specifically, the present invention relates to the racemization of aryl-amino-alkanols, e. g., d-ephedrine and related compounds.

My copending application for "Resolution of racemic mixtures," filed July 17, 1939, Serial No. 284,876, describes in some detail the importance of ephedrine in the medical field, and particularly the physiologically active laevo (l) ephedrine as distinguished from the relatively inactive dextro (d) ephedrine. It will be apparent that in the resolution of ephedrine, its analogs and related compounds, in accordance with my copending application, that both the d-form as well as the desired l-form are separated and obtained substantially pure. Since the d-form is relatively inactive, particularly as a pressor drug, it is economically desirable to racemize the d-form, that is, convert it to the racemic d-l- or inactive form, from which in turn fresh l-ephedrine may be isolated by resolution.

It has been known for some time that the reactions—

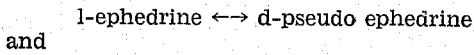
l-ephedrine ←→ d-pseudo ephedrine
and
d-ephedrine ←→ l-pseudo ephedrine may be made to come to equilibrium by the action of acids, acid halides, phosphorous halides, etc. A suggested method of carrying out the desired reaction

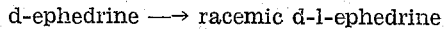
d-ephedrine ⟶ racemic d-l-ephedrine has only recently been proposed. This process which includes the use of alkali metal alcoholates possesses disadvantages. For example, side reactions take place resulting in the formation of unwanted materials, the reaction mixture darkens and extensive decomposition ensues. The necessity for extensive purification coupled with the resulting relatively poor yields due to the side reactions and formation in most instances of considerable amounts of unwanted pseudo ephedrine are, from a practical point of view, serious disadvantages. In addition, this previously suggested process has a tendency to continuously liberate water during the reaction, the presence of which during conversion accelerates decomposition.

The principal object of the present invention is to provide an improved method for the racemization of ephedrine and related compounds.

Other objects of the present invention will be apparent as the description hereinafter proceeds.

I have discovered that the amides and hydrides of alkali and alkaline earth metals provide an effective means for racemizing optically active compounds such as ephedrine and related compounds. I have also discovered that the amount of amide or hydride required for the racemization is small and that the ammonia gas liberated when using amides or hydrogen gas liberated when using hydrides, tends to prevent decomposition.

I have further discovered that racemization when carried out in accordance with the present process is substantially free from side reactions and that simple extraction of the reaction mixture with dilute acids gives a nearly colorless solution of the racemic salt. I have also discovered that in the present improved process the amount of pseudo compound formed is small and that this form may be readily separated from the desired d-l racemic mixture by recrystallization of the hydrochlorides from alcohol, or by precipitation of the normal form as the d-l-oxalate salt as hereinafter described.

The following examples will serve to illustrate the present invention.

Example I

About 50 grams of d-ephedrine base is added to 500 c. c. of decalin and a small portion of the solvent distilled to remove all water. After cooling the moisture-free reaction mixture to about 100° C. about 7.5 grams of finely divided sodamide is added in small portions. Ammonia is evolved and what appears to be a soluble sodium salt of ephedrine is formed. The complete reaction mixture (carefully protected from moisture) is then refluxed for one to two hours, or until a test portion removed and converted to the hydrochloride shows no appreciable rotation, i. e., shows the reaction to be complete.

The reaction mixture is then cooled and extracted with a slight excess of aqueous hydrochloric acid. The crystalline salt, i. e., the racemic d-l-ephedrine hydrochloride, may be obtained (with or without the preliminary treatment with decolorizing charcoal) by evaporation of the acid solution in the usual manner.

If desired, the racemic mixture may be obtained as the insoluble d-l-oxalate salt by nearly neutralizing the acid solution or extract with ammonium hydroxide followed by the addition of ammonium oxalate. The filtrate from this alternative process yields a small amount of almost pure d-l-pseudo ephedrine base upon addition of potassium carbonate.

Example II

About 10 grams of a dextro rotatory fraction from an ephedrine resolution and about 1 gram of sodamide are refluxed for about two hours in dry dibutyl ether in accordance with the method of Example I. The final acid extract shows but a trace of rotation and gives a satisfactory yield of d-l-ephedrine base.

Example III

This example follows the general methods of Examples I and II but employs potassium amide in place of sodium amide. Investigations have shown it desirable to use considerably less than one molecular proportion of this amide due to the greater reactivity of potassium amide. Conditions of conversion or racemization of the d-base to the d-l-base are otherwise similar to the above Examples I and II.

Example IV

About 7 grams of d-ephedrine are dissolved in dry decalin and about 2 grams of a 50 percent suspension of sodium hydride in paraffin added at about 70°–100° C. Hydrogen is evolved and a salt of ephedrine appears to be formed. The clear reaction solution is then refluxed for about 1 to 1.5 hours and the reaction product, i. e. racemic mixture, obtained by one of the processes described in Example I. The liberation of hydrogen in this reaction helps to prevent oxidation and keeps the destructive action on the alkaloid base down to a minimum.

The reaction mediums suitable for use in the present invention are non-aqueous (moisture-free) water-immiscible inert organic solvents. The higher boiling hydrocarbons such as xylene, decalin, hexahydro naphthalene, a kerosene fraction refluxing in the range of 120° to 210° C. etc. are representative examples. The high boiling ethers are also satisfactory solvents, particularly the ethers boiling in the 120° to 210° C. range, of which dibutyl ether is a representative example. Lower boiling solvents such as toluene may also be employed (e. g., under pressure), with a reaction temperature of 120° to 210° C. being preferred.

In place of the alkali metal amides and hydrides used in the above illustrative examples, the alkaline earth metal (e. g., calcium, strontium, barium, etc.), amides and hydrides may be substituted therefor. The alkali metal compounds are, however, preferred with the sodium amide and hydride being preferred in commercial operation.

The process of the present invention carried out in a non-aqueous reaction medium in which the reactants have no tendency to liberate water, has been found of particular value in the racemization of dextro ephedrine. The liberation on the other hand of the inert gases, i. e., ammonia or hydrogen, in the present process aids in preventing decomposition and makes possible the recovery of high yields of the racemic (d=l) mixture, from which in turn the desired l-form may be obtained by resolution.

It will be understood that the present invention is not limited to the above illustrative examples. All modifications coming within the spirit and scope of the present invention are intended to be covered by the following claims.

I claim:

1. The method of racemizing an optically active ephedrine compound which comprises heating the optically active compound in a non-aqueous reaction medium at a temperature of about 120° to 210° C. with a compound selected from the group consisting of amides and hydrides of alkali and alkaline earth metals.

2. The method of racemizing optically active compounds of the type of ephedrine which comprises refluxing said optically active compounds in a non-aqueous reaction medium with a compound selected from the group consisting of amides and hydrides of alkali and alkaline earth metals.

3. The method of converting d-ephedrine to racemic d-l-ephedrine which comprises refluxing d-ephedrine with a moisture-free inert organic solvent reaction medium containing alkali metal amide.

4. The method of converting d-ephedrine to racemic d-l-ephedrine which comprises refluxing d-ephedrine with a moisture-free inert organic solvent reaction medium containing alkali metal hydride.

5. The method of racemizing optically active ephedrine compounds which comprises refluxing said compounds with a small amount of a compound selected from the group consisting of sodium amide and sodium hydride, in an inert organic solvent refluxing in a range of about 120° to 210° C.

DONALEE L. TABERN.